Figure 1:
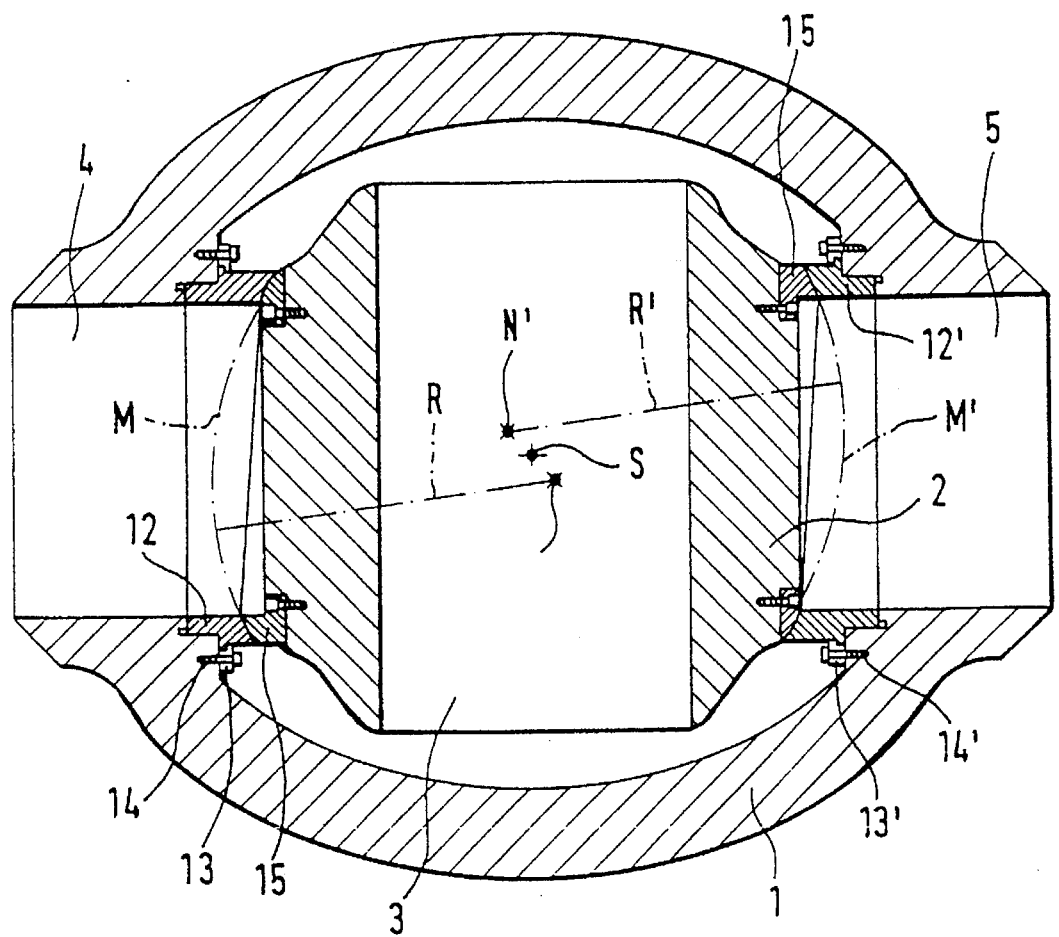

United States Patent
Klyde

[11] Patent Number: 5,482,253
[45] Date of Patent: Jan. 9, 1996

[54] BALL VALVE

[76] Inventor: Ingolf Klyde, Rageveien 42, N-4040 Harsfjord, Norway

[21] Appl. No.: 234,586

[22] Filed: Apr. 28, 1994

Related U.S. Application Data

[63] Continuation of Ser. No. 924,080, filed as PCT/NO91/00010, Jan. 30, 1991, abandoned.

[30] Foreign Application Priority Data

Mar. 19, 1990 [NO] Norway .................................. 901251

[51] Int. Cl.⁶ ...................................................... F16K 5/20
[52] U.S. Cl. ............................... 251/315.07; 251/317.01; 137/238
[58] Field of Search ...................... 251/315 EC, 315 BC, 251/315.07, 317.01; 137/238

[56] References Cited

U.S. PATENT DOCUMENTS 2,663,538  12/1953  Bacchi .
3,410,523  11/1968  Kelly et al. ........................ 251/315 EC
3,484,078  12/1969  Haenky ................................ 251/312 X
5,305,988   4/1994  Cox .

FOREIGN PATENT DOCUMENTS 0216200  9/1986  European Pat. Off. .
2752364  11/1977  Germany .

Primary Examiner—John C. Fox
Attorney, Agent, or Firm—D. Peter Hochberg; Mark Kusner; Michael Jaffe

[57] ABSTRACT

The invention relates to a ball valve of the trunnion type, comprising a valve housing having an oppositely directed coaxially aligned inlet and outlet, each of which being provided with an internal seat, and a reversible conventional valve ball formed with a through-going passage in the form of a central bore, adapted to be brought substantially into alignment with said inlet and outlet in the open position of the valve, and wherein the valve ball is adapted to close the passage through the valve housing in the closed position of the valve, establishing a sealing effect at the seats of the valve housing, the sealing surfaces of said seats following an eccentric course in relation to the geometric center of the valve ball.

6 Claims, 3 Drawing Sheets

BALL VALVE

This is a continuation of application Ser. No. 07/924,080 filed as PCT/NO91/00010, Jan. 30, 1991, now abandoned. [NOTE: This is a copy of the International Application that incorporates the amendments (PCT Article 34(2)) recited in the Annex of the International Preliminary Examination Report]

This invention relates to a ball valve of the trunnion type, comprising a valve housing having oppositely directed inlet and outlet, each of which being provided with an internal seat, and a reversible conventional valve ball formed with a through-going passage in the form of a central bore, adapted to be brought substantially into alignment with said inlet and outlet in the open position of the valve, and wherein the valve ball is adapted to close the passage through the valve housing in the closed position of the valve, establishing a sealing effect at the seats of the valve housing, the sealing surfaces of said seats following an eccentric course in relation to the geometric centre of the valve ball.

In ball valves of conventional kind, the valve ball is assigned two diametrally opposite, external trunnions preventing the ball from moving. In this case, sealing conditions are established in that the one or the other seat of the housing urges against the ball, creating a seal caused through pressure difference across the ball.

In order to make a ball valve of the trunnion type to maintain a sealing condition, prior art embodiments presuppose a displacement of one or both seats of the valve housing towards the ball. This displacement is achieved by letting the line pressure urge the seat/seats towards the ball. In order to let this happen, one is dependent on a piston area on the seats wherein the line pressure may exert a pressing force. Additionally, one has to depend on soft seals in order to maintain a positive pressure.

Deposits on seats and ball may cause i.a. sealing problems, the necessary relative movements being prevented or impeded. It is well known that e.g. hydrocarbons tend to form deposits hard to remove, in both pipe lines and in valves.

In conventional valves, one may not apply mechanical forces in order to make the valve to seal. As mentioned, such deposit problems are especially pronounced within the oil and petrochemical industries, both in refineries and oil installations offshore.

Since the media treated within said industries are very inflammable, satisfactorily operating valves are an absolute presupposition for a reliable operation.

Conventional ball valves can not be opened or closed during through-flow or at pressure difference across the valve. If one, nevertheless, tries to effect opening/closing during these circumstances, the result will be an entirely untenable "eatening-up" of the seal rings. At repeated attempts, the sealing path of the ball will also be damaged. There are, indeed, valves on the market wherein mechanical force may be supplied in order to achieve sealing. However, each of these valves has one seat only and, thus, being of no interest in the present case.

As previously mentioned, conventional ball valves of the trunnion type will be destroyed in case they should be opened while a pressure difference exists across the valve. Consequently, such valves are unsuitable as throttle valves. During opening, a small aperture will be created locally, i.e. at one side only, and this will cause a large wearing when a large fluid volume tries to pass through the small aperture. Likewise, it is very difficuelt to effect maintenance on valves being under pressure, and lacking maintenance results inevitably in smaller or larger leakages. In this connection, there is a great need for a ball valve which will keep itself clean automatically. A ball valve structure wherein the seats of the housing and the seals on the ball easily may be detached and exchanged would, likewise, meet a desideratum felt for a long time.

DE-C-27 52 364 discloses a ball valve of the kind defined introductorily. This publication teaches a valve ball constituted by two spherical ball halves, mutually staggered along an imaginary dividing plane, thus providing valve ball surfaces following eccentric courses in relation to their rotational point, corresponding to the geometric centre of the ball-shaped valve body. This special valve ball cooperates with the sealing surfaces of the seats directly.

The staggering of said two spherical ball halves necessitates a corresponding mutual staggering of inlet and outlet. This means that the ball valve according to DE-C-27 52 364 is no longer a through conduit valve. Thus, it is impossible to combine the desired feature of the eccentric valve ball and the desired feature of coaxially aligned inlet and outlet. This prior art ball valve is quite useless for a number of applications.

The object of the present invention is to obviate these deficiencies and disadvantages as well as limitations of use, thus providing a ball valve of the kind defined introductorily exhibiting the above discussed eccentricity at the mutually cooperating sealing surfaces of seats and valve ball, simultaneously maintaining the inlet and outlet exactly coaxially aligned. Such a ball valve will be particularly suitable as a double block and bleed valve.

In accordance with the invention, said object is achieved by forming the ball valve according to the features indicated in the characterizing part of the following claim 1.

Advantageous embodiments appear from the sub claims.

Through the eccentric course of all four sealing surfaces, cooperating in pairs, in relation to the centre of the valve ball, a particularly efficient sealing action is achieved, the sealing action being optimalized with increasing mechanical closing force. In the open condition of the valve—because of the sealing surface course of the valve house seats in relation to the centre of the ball—only two diagonally opposite ball portions will be positioned adjacent to, but not entirely onto each separate seat portion, so that, at each valve housing seat, between the sealing surface thereof and the ball portion resting thereon, there being established a narrow circumferential slot extending along the entire seat periphery and, thus, exhibting a relatively large flow area (substantially larger than in known valves) for fluid into the interior of the valve housing. Within the valve housing, the flowing fluid will effect a very desirable flushing and cleaning function, causing an efficient washing, cleaning the ball with its seals and the internal valve housing walls and seats. Thus, in the open valve position, the fluid flow within the housing, through the flushing action thereof, counteracts deposits and buidling-up of various matermals such as sand, grease, solidified hydrocarbons, calcium, chalk, etc. Thus, in the ball valve according to the invention, an automatic cleaning process is carried into effect, representing a substantial technical progress. This flow of fluid through the valve in the open position thereof, will not influence the ball path disadvantageously towards closed position, as this will be located within the housing. The relatively large flow area established, in the open position of the valve, between the seats of the valve housing and the ball, causes a quite neglectable wearing of the valve parts. This enables the ball valve according to the invention to serve as a throttle valve. On the other hand, conventional ball valves of the type in question are unsuitable for such a task.

The seals on the ball and the seats in the valve housing, respectively, and including sealing surfaces, consist advantageously of metal. Metal/metal-seals are previously known per se.

A ball valve having metal seats and being formed with eccentric seat/sealing surfaces according to the invention, may be used in piping systems wherein the pressure of the flowing fluid substantially exceeds those pressure conditions whereunder ordinary ball valves can operate. At so high pressures, the ball of conventional ball valves of the klind in question will bend/flex where the material is thinnest, i.e. at diagonally opposite lateral portions. Through designing the ball with a large material thickness within both sealing rings, the ball of the valve according to the invention is not flexible in nearly the same degree when influenced by high pressures.

Thus, in the ball valve according to the invention, a positive sealing at two diagonally opposite sides of the valve ball is achieved, independent on spring force and/or pressure difference across the seats. In such a valve, low pressure sealing will be as good as high pressure sealing.

Figure 2:
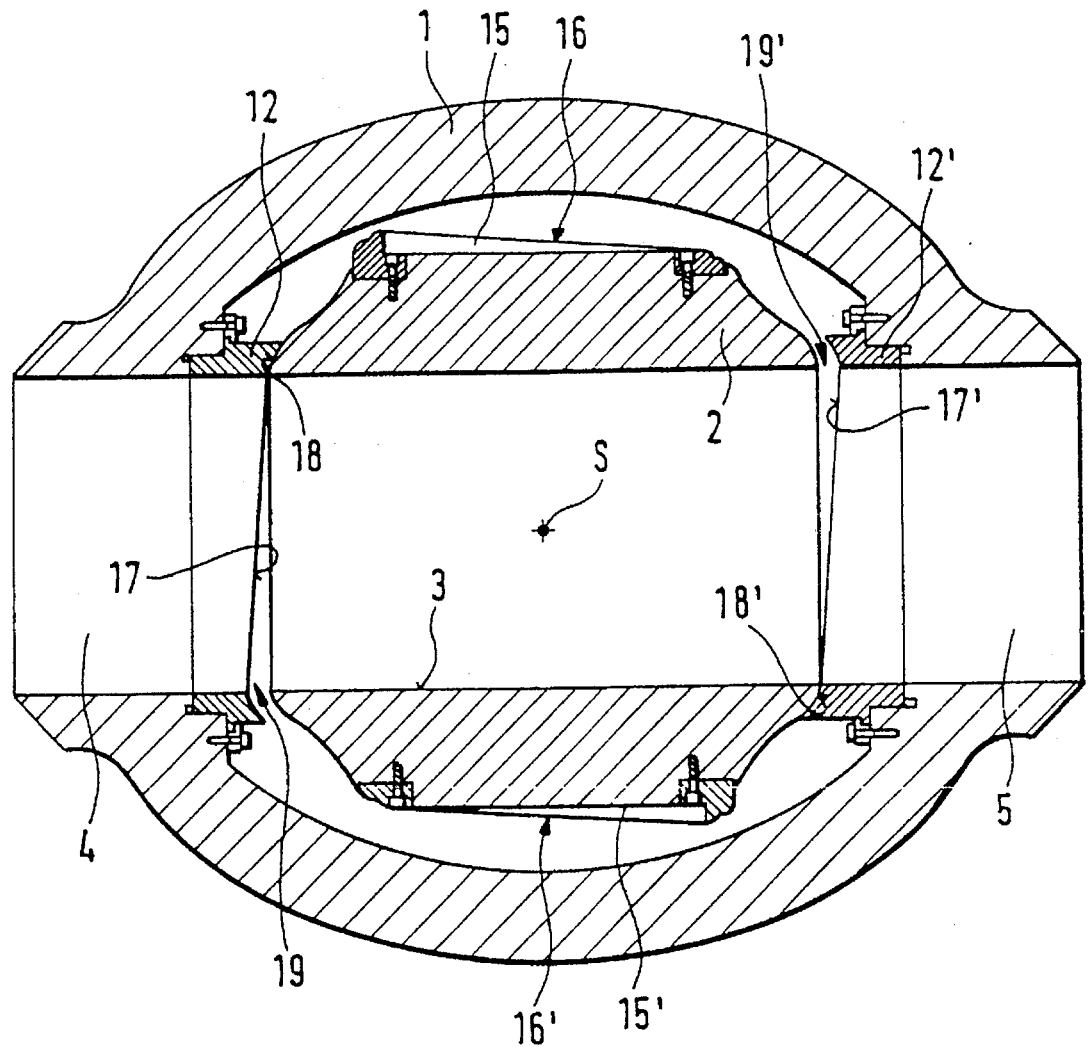
Figure 3:
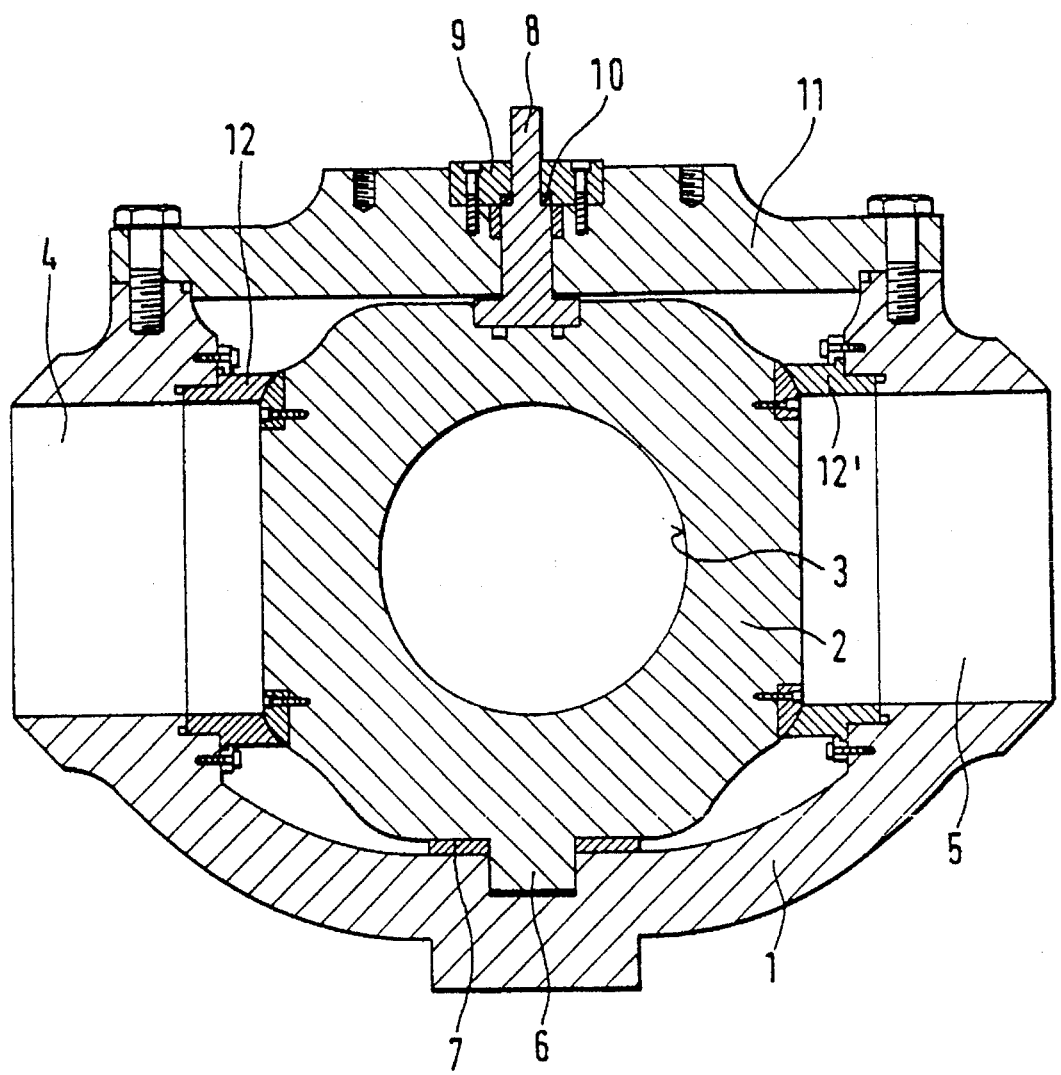

Further objects, advantages and features of the ball valve according to the invention will appear from the following specification of an example of a preferred embodiment, reference being made to the accompanying diagrammatical drawings, wherein:

FIG. 1 shows the ball valve, in an axial section, in the closed position;

FIG. 2 corresponds to FIG. 1 and shows the ball valve in the open position;

FIG. 3 is a section at right angles to the axial section of FIG. 1, and shows further details of the valve structure.

In the drawings, reference numeral 1 denotes the housing of a ball valve; 2 indicating generally the ball-shaped valve body, the valve ball, which, as known per se, is formed with a central passage in the form of a through-going circular-cylindrical bore 3.

The valve housing 1 is formed with diagonally opposite openings 4 and 5 in the form of circular-cylindrical bores having the same cross-sectional area as the passage 3 of the ball 2. In use, the ball valve is coupled into a pipe line carrying flowing fluid in liquid or gaseous form, and one housing opening, e.g. 4, may then act as the inlet, the other housing opening 5 acting as the outlet, provided a direction of flow from left to right according to FIGS. 1 and 2, or vice versa.

Reference is now made to FIG. 3 showing the constructive building-up of the ball valve, and wherein the reference numeral 6 denotes the trunnion 2 of the ball, 7 indicating lining. Diagonally opposite the trunnion 6, the valve stem is arranged. In a cavity of a sealing ring or sleeve 9 surrounding the stem 8, a thrust bearing (ball bearing) 10 is placed. The reference numeral 11 denotes the valve lid.

In the closed position of the ball valve, FIGS. 1 and 3, the passage 3 of the ball extends at right angles to the axis of the inlet and the outlet 4,5, breaking the fluid communication therebetween, the passage 3, in the open position of the valve according to FIG. 2, being brought into alignment with the inlet and the outlet 4,5, thus establishing an unimpeded passage through the valve; this representing the main principle of most known ball valves. Furthermore, the longitudinal axis of passage 3 is preferably coaxial with the central axis of inlet 4,5, when the ball valve is in the open position.

In the closed position of the valve, optimum sealing between the ball and the valve housing openings 4,5 should be established. For that purpose, the valve housing 1 internally is provided with annular seats 12 and 12' extending around the inner mouth portion of each opening 4,5. Annular seats 12 and 12' are received by respective annular mounting surfaces formed in the housing around each opening 4,5. For attachment of the housing seats 12,12', the valve housing 1 is, at each opening thereof, formed with a graded flange-like portion to which the respective seat is fixed by means of an attachment rim 13,13' and screws 14,14'. The particular design of the sealing surfaces of this housing seats 12,12' will be discussed later on in the specification.

In accordance with the invention, the valve-ball 2, at two diagonally opposite sides, is provided with seals 15,15', the sealing surfaces thereof being denoted 16 and 16', respectively, in FIG. 2, in which the corresponding sealing surfaces of the housing seats are indicated at 17 and 17', respectively. Seas 15,15', are received planar annular mounting surfaces formed on valve ball 2. The mounting surfaces are symmetric with respect to the geometric axis of valve ball 2.

According to the invention, all sealing surfaces 17,17', 16, 16' of the seats 12,12'/the seals 15,15' have a central axis that is skewed relative to the central axis of inlet 4,5, and follow a circular-annular course eccentric with regard to the geometric centre S of the ball 2 in an axial plane, FIGS. 1 and 2.

More particularly, cooperating sealing surfaces 16 and 17 extend along a circle M, the radius thereof being denoted R and the centre N being spaced from the geometric centre S of the ball 2. Similarily, the cooperating sealing surfaces 16' and 17' extend along a circle M' having a radius indicated at R', and the centre N' thereof being spaced correspondingly from the centre S of the ball 2, and situated diagonally vis-a-vis the centre N in relation to the centre S. These conditions which are characteristic of the present invention, apply for the constructive design of the sealing surfaces 16,16', 17,17' only, and the centres N and N' do, of course, not form any pivot point; the actual pivot point being represented by the geometric centre S of the ball only. It will be appreciated that the sealing surfaces 16, 16', 17, 17' are eccentric with respect to the geometric center axis of ball 2 in both the axial direction of the coaxially aligned inlet and outlet 4, 5 in both the direction which is perpendicular thereto, and perpendicular to the rotational axis of ball 2, whereby the eccentricity of one of the seats 12, 12' is opposite along the directions to the eccentricity of the other seats 12, 12' with respect to the geometric center axis of the valve ball.

According to the shown embodiment, when the ball valve is occupying its open position, FIG. 2, only two diagonally opposite ball portions 18,18' will be positioned close to the housing seats, thereby exposing slots 19 and 19' between the remaining mouth portion of the housing seats 12,12' and the adjacent ball portions (around the passage 3), so that the flowing fluid is allowed to flow into and around the interior of the valve housing and, thus, flush and wash the internal components of the valve. These exposed slots 19,19' at the inlet and the outlet, respectively 4 and 5, exhibit a relatively large flow area laterally of the flow, and this condition assists i.a. to reduce possible wearing of the valve components.

When the valve ball 2 by means of the stem 8 is rotated about 90 degrees to the closed position, FIGS. 1 and 3, the sealing surfaces on the housing and ball, cooperating in pairs and being eccentric in relation to the rotational point S of the ball 2, will cause a clamping action, resulting in a very efficient sealing which, owing to the eccentricity, will be optimalized with increasing (mechanical) tightening force; (the harder tightening, the better sealing). The two design-centres N,N' will give an advantageous "scissors effect" when the valve closes, the rotation of the ball from the open towards the closed position giving rise to a sealing mechanical application of forces between seats/seals cooperating in pairs. Additionally, this condition will support the ball member, as it is clamped from both sides.

In addition to the previously mentioned advantages, it could be indicated that the present ball valve is designed such that one does not have to change the ball 2 in case the valve should start to leak from one reason or another. Both housing seats 12,12' and the ball seals 15,15' are designed such that they easily may be demounted and exchanged.

This is, particularly, of great importance with large ball valves, wherein the ball-shaped valve body, the valve ball, may cost as much as Norw. Krs. 500,000.

I claim:

1. A ball valve of the trunnion type, comprising:

a valve housing comprising:
  oppositely directed coaxially aligned inlet and outlet, each inlet and outlet having a central axis, and
two annular sea mounting surfaces;
  two detachable valve housing seats mounted respectively to said two seat mounting surfaces of said valve housing, each valve housing seat having a respective sealing surface, said sealing surfaces having central axis skewed relative to the central axis of said inlet and outlet;

a valve ball rotatable about its geometric center axis between an open position for opening said ball valve to fluid flow and a closed position for closing said ball valve to fluid flow, said valve ball comprising:
  a passage in the form of a centrally through-going bore having a longitudinal axis and adapted to be brought substantially into alignment with said inlet and outlet in the open position of the ball valve, said central axis of said inlet and outlet and said longitudinal axis of said bore being coaxial in the open position of the valve, and
  two annular seal mounting surfaces; and two detachable valve ball seals mounted respectively to said two seal mounting surfaces, each valve ball seal having a respective sealing surface cooperating respectively with said sealing surfaces of said valve housing seats, said valve ball being adapted to close the passage through the valve housing in the closed position of the ball valve, wherein said respective sealing surfaces of said valve housing seats and said valve ball follow an eccentric course with regard to the geometric center axis of said valve ball to maintain sealing at the respective valve ball seals and valve housing seats when said valve ball is in the closed position, and to form a pair of slots at said inlet and outlet respectively, when said valve ball is in the open position, allowing fluid to pass through to the interior of the valve housing to flush and clean said valve housing and valveball.

2. A ball valve as set forth in claim 1, wherein a first pair of cooperating sealing surfaces are formed by the sealing surface of one of said valve housing seats and the sealing surface of the valve ball seal which cooperates with said one valve housing seat, said first pair of cooperating sealing surfaces extending along an arc of a first circle in an axial plane, the center the radius of the first circle being offset from the geometric center axis of the valve ball; and second pair of cooperating sealing surfaces are formed by said sealing surface of the other of said valve housing seats and the sealing surface of the valve ball seal which cooperates with said other of said valve housing seats, said second pair of cooperating sealing surfaces extending along an arc of a second circle in said axial plane, the center of the radius of the second circle being offset from the geometric center axis of the valve ball, though located diametrically opposite the center of the first circle with regard to the geometric center axis of the valve ball.

3. A ball valve as set forth in claim 2, wherein said valve housing seats and said valve ball seals are comprised of metal, and formed as rings, said valve housing seats and valve ball seals removably attached by screws to said valve housing and valve ball, respectively.

4. A ball valve as set forth in claim 1, wherein said valve housing seats and said valve ball seals are comprised of metal, and formed as rings, said valve housing seats and valve ball seals removably attached by screws to said valve housing and said valve ball, respectively.

5. A ball valve as set forth in claim 1, wherein said seal mounting surfaces are symmetrical about the geometric center axis of said valve ball.

6. A ball valve as set forth in claim 1, wherein said sealing surfaces of said valve housing seats and said sealing surfaces of said valve ball seals are eccentric with respect to the geometric center axis of said valve ball in both the axial direction of the coaxially aligned inlet and outlet and the direction which is perpendicular thereto, and perpendicular to the rotational axis of the valve ball, whereby the eccentricity of one of said valve housing seats is opposite along the directions to the eccentricity of the other of said valve housing seats with respect to the geometric center axis of the valve ball.

* * * * *